United States Patent Office 3,497,573
Patented Feb. 24, 1970

3,497,573
BLOCK COPOLYMERS OF PROPYLENE AND A POLAR MONOMER
Donald E. Hostetler, Monroeville, Pa., assignor to Dart Industries, Inc., a corporation of Delaware
No Drawing. Filed Jan. 18, 1966, Ser. No. 521,414
Int. Cl. C08f 15/40; C08g 1/18, 23/04
U.S. Cl. 260—876
16 Claims

ABSTRACT OF THE DISCLOSURE

A crystalline polypropylene having dyeable properties is prepared by forming a mixture of a homopolymer and copolymer propylene and providing a terminal block copolymer on at least some of the homopolymer and copolymer chains of a polar monomer.

---

The present invention relates to a novel and useful composition and to a process for producing such a composition. More particularly, it relates to a polypropylene composition having better clarity and better printability and dyeability. In a specific embodiment it relates to polypropylene having better clarity, dyeability, improved impact resistance, and higher stiffness than polypropylene known heretofore in the art.

In summary my invention comprises providing a crystalline polypropylene containing in the polymer chain the grouping P—F whereby (P) represents a composition selected from the group consisting of a polypropylene homopolymer, a propylene/ethylene random copolymer and a propylene/ethylene block copolymer, and (F) represents a terminal block copolymer chain selected from the group consisting of vinyl compounds, oxethanes and acetaldehyde.

By the term "vinyl compound" is meant a compound which can be represented as:

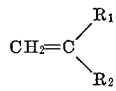

in which $R_1$ can be chosen from the group consisting of hydrogen, nitrile, carboxylic acid or esters thereof, ketone, a substituted alkyl or aryl group, ether, or organic phosphonates; $R_2$ can be chosen from the group consisting of nitrile, carboxylic acid or esters thereof, ether, or organic phosphonates. Preferably, $R_1$ is hydrogen and $R_2$ can be as chosen above. By this definition, it is evident that unsaturated compounds containing only the elements carbon and hydrogen are not included in the term "vinyl compounds."

The vinyl compounds operable in my invention are acrylonitrile, N-vinyl pyrrolidone, 2-methyl-5-vinylpyridine, 4-vinylpyridine, 3-vinylpyridine, 2-ethyl-5-vinylpyridine, 4-isopropyl-6-vinylpyridine, 5-methyl-2-vinylpyridine, 3-propyl-5-vinylpyridine, 2,3-dimethyl-5-vinylpyridine, 3,6-diethyl-4-vinylpyridine, 2-ethyl-3-methyl-5-vinylpyridine, isobutylvinylether, dimethylaminoethylvinyl ether, vinylacetate, bis(beta-chloroethyl) vinyl phosphonate, methacrylic acid, ethacrylic acid, methyl methacrylate, butylmethacrylate, isobutylethylacrylate, methyl vinyl ketone, and others.

The oxethanes operable in my invention are the cyclic ethers having a three to five membered ring. Examples of some oxethanes eminently suitable include ethylene oxide, tetrahydrofuran, tetrahydrofurfurylamine and others.

As heretofore known, propylene can be polymerized to a high molecular weight solid polymer by contacting propylene with a catalyst such as titanium trichloride/triethyl aluminum. Typical methods of preparing polypropylene are disclosed in Belgian Patent 538,782 and U.S. Patents 2,949,447; 2,911,384 and 2,825,721. Generally, such processes produce propylene polymers having a molecular weight of from about 50,000 to about 5,000,000 with the major proportion of the polymer being crystalline, in that it exhibits a crystalline structure by X-ray analysis and is insoluble in heptane. Crystalline polypropylene is well known in the art for its highly desirable properties such as high tensile strength, high modulus of elasticity, and good resistance to elevated temperatures. However, in spite of these desirable physical properties, crystalline polypropylene is difficult to print on without pre-treatment of the polymer surface, and also exhibits clouding and haziness when the films are produced. Since polypropylene is a low cost competitor of cellophane in the food wrapping and packaging industry, these defects are formidable obstacles to polypropylene's wide-spread acceptance by the industry.

It is, therefore, an object of the present invention to provide a polypropylene composition which has improved clarity in thin films. A further object is to provide a polypropylene composition which has improved printability and dyeability without necessitating any pre-treatment of the polypropylene surface. Another object is to provide a polypropylene composition which has higher impact strength and other improved properties than conventional crystalline polypropylene. A still further object is to provide a process for preparing the polypropylene composition in situ. Other objects will become apparent as the description of the invention proceeds.

I have found that polypropylene, whether a block copolymer, random copolymer, or homopolymer possesses unusual and desirable properties when a terminal block segment chosen from the group consisting of oxethanes, vinyl compounds, and acetaldehyde is formed on said polypropylene chain.

In a preferred embodiment of my invention the terminal block of oxethanes or vinyl compounds is employed in the polypropylene in the range of 1–5% by weight, although the terminal block copolymers can be operably employed in the range of 0.1 to 25% by weight based on the weight of the polymers in the composition.

The percentages by weight are based upon the propylene and comonomer used to form the crystalline polypropylene compositions. Should other polymer or materials be added to the compositions of the present invention, the weights of such added materials are excluded from weight percentage calculations.

The catalyst employed may be any of those well-known in the art. For example, $3TiCl_3 \cdot AlCl_3$ or $TiCl_3$ may be used in conjunction with a hydrocarbon aluminum compound such as triethyl aluminum, triisobutyl aluminum, triisohexyl aluminum, trioctyl aluminum, dimethyl aluminum chloride, diethyl aluminum chloride, ethyl aluminum dichloride or methyl aluminum dibromide. Other catalysts which are well known in the art for propylene polymerization reaction may likewise be employed in the process.

In carrying out the reaction to produce the copolymers of my invention, the propylene monomer is contacted with the catalyst at any temperature within the range of about −50° F. to about 200° F. Preferably, the reaction is carried out somewhat above room temperature and a particularly preferred temperature range is from about 80° F. to about 180° F. The reactor is then vented of propylene, and a comonomer chosen from the group consisting of oxethanes, vinyl compounds, and acetaldehyde is added to the reactor. This process will produce a polypropylene homopolymer with a terminal block copolymer of the chosen comonomer.

Alternately a polypropylene/polyethylene block copolymer can first be formed in the reactor by polymerizing propylene, venting the reactor and adding ethylene. The reactor is then vented of ethylene, and the chosen comonomer selected from the group supra is added to produce a terminal block segement on the propylene/ ethylene block copolymer chain. The procedure for forming a propylene/ethylene block copolymer is described in French Patent 1,358,708.

A propylene/ethylene random copolymer can also be produced in the reactor by polymerizing propylene in the presence of ethylene, and then venting the reactor. The chosen comonomer selected from the group supra is then added to form a terminal block segment on the propylene/ethylene random copolymer chain.

Although the preceding discussion regarding the process for polymerizing propylene homopolymers, block copolymers, or random copolymers implies that polymerization is continuous, in fact this is not so. As is now known, due to the presence of hydrogen, there is a constant termination of polymer chains. This in turn gives rise to a mixture of polymers, the exact composition of which depends on how many active sites were present on the polymer backbones when a new monomer was added to the reaction vessel. In my experiment, the final product obtained is a mixture comprising small amounts of crystalline polypropylene, minor amounts of polyethylene, minor amounts of the polymerized F group, and varying amounts of polypropylene-polyethylene block and random copolymers having a terminal block F copolymer.

We have chosen to represent any of the compositions produced supra as P—F in which P represents the polypropylene homopolymer, a propylene/ethylene block copolymer or a propylene/ethylene random copolymer, and F is a terminal block copolymer selected from the group consisting of oxetanes and vinyl compounds, and acetaldehyde.

The following examples are given to illustrate the invention and are not intended to limit it in any manner. In all examples all parts are expressed in parts by weight unless otherwise indicated.

The melt index of the examples is expressed in decigrams per minute as measured by ASTM–D–1238–62T, condition L, unless otherwise noted.

EXAMPLE 1

Polypropylene with a terminal block of polyacrylonitrile

To a 700 ml. stirred stainless steel pressure reactor is charged, under an argon atmosphere, 0.31 g. of

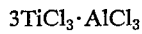

$3TiCl_3 \cdot AlCl_3$ and 3.1 cc. of 1.0 molar diethyl aluminum chloride in cyclohexane. The Al/Ti mole ratio is 1.5 to 1. The reactor is purged with hydrogen, closed, and pressured to 5 p.s.i.g. with hydrogen. The 400 ml. of liquid propylene (0.58 g./cc.) is introduced with stirring at 75° F. The polymerization temperature is increased within about 5–10 minutes to 130° F. with external heating. The reactor pressure is that of the propylene gas at equilibrium.

At the end of he first 45 minutes, 200 ml. of additional liquid propylene is added to maintain a slurry in the reactor. At the end of 1.5 hours the reactor is vented to 0 p.s.i.g., purged with argon, and heated to 110° F. After 5 minutes at 110° F. with a small flow of argon through the reactor, 50 cc. (39.8 g.) of acrylonitrile is sprayed into the reactor. The acrylonitrile was obtained commercially, and contained 0.1% by weight dry ammonia as a stabilizer. The reactor is then closed and stirred for 1 hour at 140° F.

The polymer is then transferred into a two liter beaker and slurried for 2 hours at 70° C. with 1 liter of a 50/50 volume mixture of heptane and isopropyl alcohol. The hot slurry is then filtered and the washing repeated with fresh heptane-isopropyl alcohol mix. After filtering, the washed polymer is vacuum dried for 4 hours at 80° C.

A yield of 100 grams of dry powdered polymer is obtained with a melt index of 1.3 at 230° C. according to ASTM–D–1238–62T. By infra-red analysis the polymer is found to contain 2.7 weight percent acrylonitrile.

A sample of the powdered polymer was melt spun into 5 mil diameter monofilaments. A 2 gram portion of the fiber was immersed in a dilute acid dyebath containing 0.5 weight percent "Acid Blue 22." After 30 minutes at 80 to 90° C. the fiber was removed from the dyebath and scrubbed with a 1% solution of a commercial detergent. The deep blue colored fiber was then rinsed with water and dried. No change in the color was observed when a sample of the dyed fiber was dry-cleaned at 50° C. for one hour in a solution made with carbon tetrachloride, ligron and amyl alcohol.

In connection with the copolymer of acrylonitrile and propylene, I have found that dry ammonia has a profound effect on the amount of acrylonitrile incorporated in the block copolymer. However, it is not necessary that the commercially stabilized acrylonitrile be used. For instance, I treated distilled acrylonitrile with dry $NH_3$, and also treated the polypropylene powder with the $NH_3$ just before acrylonitrile addition, i.e., after 5 minutes at 110° C., with a small flow of argon through the reactor, dry $NH_3$ was sprayed in. The amount of ammonia used is preferably between 0.1–0.6% by weight of acrylonitrile, no matter when it is added.

In order to determine exactly what effect ammonia addition had on the copolymerization, a run was made with distilled acrylonitrile, and no ammonia added. Although a polymer yield of 180 g. was obtained, using the same general procedure above, no acrylonitrile was found in the polymer by infra-red analysis.

On the other hand, when 0.47 wt. percent $NH_3$ and 0.24 wt. percent $NH_3$ were added respectively to the polypropylene powder before addition of distilled acrylonitrile, final polymers contained 2.1 and 0.7% acrylonitrile respectively.

EXAMPLE 2

Polypropylene/polyethylene random copolymer with terminal block 4, vinylpyridine To a 700 mol stirred stainless steel pressure reactor is charged, under an argon atmosphere, 0.36 g. of $3TiCl_3 \cdot AlCl_3$ and 4.7 cc. of 1.0 molar diethyl aluminum chloride in cyclohexane. The Al/Ti mole ratio is 2/1. The reactor is purged with hydrogen, closed, and pressured to 5 p.s.i.g. with hydrogen. Then 400 ml. of liquid propylene (0.58 g./cc.) is introduced with stirring at 75° F. The polymerization temperature is increased within about 10 minutes to 140° F. with external heating. The reactor pressure is that of the propylene gas at equilibrium. Five minutes after the propylene charge, 0.4 g. of ethylene is added gradually over a period of 15 seconds. The ethylene addition, which is used up in 1 to 2 minutes, is repeated every 15 minutes until 2.8 g. of ethylene is added. The propylene concentration is maintained in the reactor by adding 15 cc. of liquid propylene every 5 minutes during the run. At the end of 1.75 hours the reactor is vented to 0 p.s.i.g., purged with argon and heated to 150° F. After 10 minutes at 150° F., with a small flow of argon through the reactor, 10 cc. (9.8 g.) of 4-vinylpyridine is sprayed into the reactor. The reactor is then closed and stirred for 3 hours at 130° F.

The polymer is then transferred into a two liter beaker and slurried for 2 hours at 70° C. with 1 liter of a 50–50 volume mixture of heptane and isopropyl alcohol. The hot slurry is then filtered and the washing repeated with fresh heptane-isopropyl alcohol mix. After filtering, the washed polymer is vacuum dried for 4 hours at 80° C.

A yield of 140 g. of dry powdered polymer is obtained with a melt index at 230° C. according to ASTM–D–1238–62T of 2.1. By infrared analysis the polymer is found to contain 2.0 weight percent ethylene and 5.7 weight percent 4-vinylpyridine. The polymer showed excellent dyeability, using the procedure in Example 1.

EXAMPLE 3

Polypropylene/polyethylene block copolymer with terminal block 2, methyl-5, vinylpyridine To a 700 ml. stirred stainless steel pressure reactor is charged, under an argon atmosphere, 0.34 g. of $3TiCl_3 \cdot AlCl_3$ and 4.9 cc. of 1.0 molar diethyl aluminum chloride in cyclohexane. The Al/Ti mole ratio is 2/1. The reactor is purged with hydrogen, closed, and pressured to 5 p.s.i.g. with hydrogen. Then 400 ml. of liquid propylene (0.58 g./cc.) is introduced with stirring at 75° F. The polymerization temperature is increased within about 10 minutes to 140° F. with external heating. The reactor pressure is that of the propylene gas at equilibrium. Five minutes after the propylene charge, 0.5 g. of ethylene is added gradually over a period of 15 seconds. The ethylene addition, which is used up in 1 to 2 minutes, is repeated every 15 minutes until 3.5 g. of ethylene is added. The propylene concentration is maintained in the reactor by adding 15 cc. of liquid propylene every five minutes during the run. At the end of 1.75 hours the reactor is vented to 0 p.s.i.g. and heated to 130° F. Ethylene is again added to 1.0 g./minute for 10 minutes. Five minutes later the pressure is 5 p.s.i.a. After 5 minutes at 150° F. with a small flow of argon through the reactor, 10 cc. (9.7 g.) of 2-methyl-5-vinylpyridine is sprayed into the reactor. The reactor is then closed and stirred for 1 hour at 130° F.

The polymer is then transferred into a two liter beaker and slurried for 2 hours at 70° C. with 1 liter of a 50–50 volume mixture of heptane and isopropyl alcohol. The hot slurry is then filtered and the washing repeated with fresh heptane-isopropyl alcohol mix. After filtering, the washed polymer is vacuum dried for 4 hours at 80° C.

A yield of 170 g. of dry powdered polymer is obtained with a melt index of 230° C. according to ASTM–D–1238–62T of 2.0. By infrared analysis the polymer is found to contain 7.1 weight percent ethylene and 3.2 weight percent 2-methyl-5-vinylpyridine. Monofilament treated as in Example 1 showed excellent dyeability.

EXAMPLE 4

Polypropylene with a terminal block of N-vinylpyrrolidone

Using the same procedure as Example 1, except that 20 cc. (20 g.) of N-vinylpyrrolidone were sprayed into the reactor and reacted for 3 hours at 150° F., 191 g. of dry powdered polymer were obtained with a melt index of 2.4. By infrared analysis the polymer was found to contain 7.0 weight percent N-vinylpyrrolidone. Monofilaments of the polymer treated as in Example 1 showed excellent dyeability.

EXAMPLE 5

Polypropylene/polyethylene random copolymer with terminal block dimethylaminoethylvinylether Using the same procedure as Example 2, except that 15 cc. (15 g.) of dimethylaminoethylvinylether were sprayed into the reactor, and reacted for 6 hours at 130° F., 205 g. of dry powdered polymer were obtained with a melt index of 8.8. By infrared analysis the polymer was formed to contain 2.4 weight percent ethylene and 2.4 weight percent dimethylaminoethylvinylether. Monofilaments of the polymer treated as in Example 1 showed excellent dyeability.

EXAMPLE 6

Polypropylene/polyethylene block copolymer with terminal block of isobutylvinylether Using the same procedure in Example 3, except that 15 cc. (135 g.) of isobutylvinylether were sprayed into the reactor, and reacted for 1 hour at 150° F., 184 g. of dry powdered polymer were obtained with a melt index of 0.1. By infrared analysis the polymer was found to contain 2.1 weight percent ethylene and 6 weight percent isobutylvinyl ether.

Monofilaments of the polymer were immersed in liquid propylenimine for 30 minutes at 30° C. then rinsed with water and treated as in Example 1. The resulting fibers were deep blue colored.

EXAMPLE 7

Polypropylene with terminal block of vinyl acetate

Using the same procedure as Example 1, except that 25 cc. (18 g.) of vinyl acetate were sprayed into the reactor and reacted for 1 hour at 150° F., 136 g. of dry powdered polymer were obtained with a melt index of 2.0. By infrared analysis the polymer was found to contain 0.7 weight percent vinyl acetate. Monofilament of the polymer treated as in Example 6 showed excellent dyeability.

EXAMPLE 8

Polypropylene/polyethylene random copolymer with terminal block methacrylic acid Using the same procedure as Example 2, except that 20 cc. (20 g.) of methacrylic acid were sprayed into the reactor, and reacted for 3 hours at 240° F., 122 g. of dry powdered polymer were obtained with a melt index of 2.5. By infrared analysis the polymer was formed to contain 2.1 weight percent ethylene and 0.5 weight percent methacrylic acid. Monofilaments of the polymer treated as in Example 6 showed excellent dyeability.

EXAMPLE 9

Polypropylene/polyethylene block copolymer with terminal block of bis(beta-chloroethyl) vinyl phosphonate Using the same procedure of Example 3, except that 15 cc. of bis (beta-chloroethyl) vinylphosphonate were sprayed into the reactor and reacted for 3 hours at 240° F., 250 g. of dry powdered polymer were obtained with a melt index of 3.5. By infrared analysis, the polymer was found to contain 2.0 weight percent ethylene and 2.6 weight percent bis (betachloroethyl) vinylphosphonate. Monofilaments of the polymer treated as in Example 6 showed excellent dyeability.

EXAMPLE 10

Polypropylene with terminal block ethylene oxide

Using the same procedure as Example 1, except that 38 cc. (27 g.) of ethylene oxide were sprayed into the reactor and reacted for 1 hour at 130° F., 124 g. of dry powdered polymer were obtained with a melt index of 6.2. By infrared analysis the polymer was found to contain 11 weight percent ethylene oxide. Monofilaments of the polymer treated as in Example 6 showed excellent dyeability.

EXAMPLE 11

Polypropylene/polyethylene random copolymer with terminal block tetrahydrofurfurylamine Using the same procedure as Example 2, except that 15 cc. (13.5 g.) of tetrahydrofurfurylamine were sprayed into the reactor and reacted for 3 hours at 150° F., 170 g. of dry powdered polymer were obtained with a melt index of 3.0. By infrared analysis the polymer was found to contain 2.4 weight percent ethylene and 3.0 weight percent tetrahydrofurfurylamine. Monofilaments of the polymer treated as in Example 1 showed excellent dyeability.

EXAMPLE 12

Polypropylene/polyethylene block copolymer with terminal block of tetrahydrofuran Using the same procedure of Example 3, except that 15 cc. (12 g.) of tetrahydrofuran were sprayed into the reactor and reacted for 3 hours at 100° F., 137 g. of dry powdered polymer were obtained with a melt index of 1.5. By infrared analysis, the polymer was found to contain 2.5 weight percent ethylene and 10.5 weight percent tetrahydrofuran. Monofilaments of the polymer treated as in Example 6 showed excellent dyeability.

EXAMPLE 13

Polypropylene with terminal block of acetaldehyde

Using the same procedure as in Example 1, except that 15 cc. (10.5 g.) of acetaldehyde were sprayed into the reactor and reacted for 5 hours at 130° F., 134 g. of dry powdered polymer were obtained with a melt index of 6.1. By infrared analysis, the polymer was found to contain 3.4% acetaldehyde. Monofilaments of the polymer treated as in Example 6 showed excellent dyeability.

EXAMPLE 14

Polypropylene/polyethylene random copolymer with terminal block methyl vinyl ketone Using the same procedure as in Example 2, except that 20 cc. (17 g.) of methyl vinyl ketone were sprayed into the reactor and reacted for 3 hours at 150° F., 180 g. of dry powdered polymer were obtained with a melt index of 3.5. By infrared analysis, the polymer was found to contain 3.0% ethylene and 3.1% methyl vinyl ketone. Monofilaments of the polymer treated as in Example 6 showed excellent dyeability.

EXAMPLE 15

Propylenehomopolymer control

To a 700 ml. stirred stainless steel pressure reactor is charged, under an argon atmosphere, 0.28 g. of

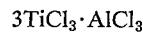

and 3.6 cc. of 1.0 molar diethyl aluminum chloride in cyclohexane. The Al/Ti mole ratio is 2/1. The reactor is purged with hydrogen, closed, and pressured to 5 p.s.i.g. with hydrogen. Then 400 ml. of liquid propylene (0.58 g./cc.) is introduced with stirring at 75° F. The polymerization temperature is increased within about 10 minutes to 150° F. with external heating. The reactor pressure is that of the propylene gas at equilibrium. At the end of the first 45 minutes, 200 ml. of additional liquid propylene is added to maintain a slurry in the reactor. At the end of 1.5 hours the reactor is vented to 0 p.s.i.g. and cooled.

The polymer is then transferred into a two liter beaker and slurried for 2 hours at 70° C. with 1 liter of a 50–50 volume mixture of heptane and isopropyl alcohol. The hot slurry is then filtered and the washing repeated with fresh heptane-isopropyl alcohol mix. After filtering, the washedpolymer is vacuum dried for 4 hours at 80° C.

A yield of 216 g. of dry powdered polymer is obtained with a melt index at 230° C. according to ASTM–D–1238–62T of 1.2. A sample of this polymer was melt spun into monofilaments and treated as described in Example 1 and Example 6. No visual coloration was observed in the treated samples as compared with untreated monofilaments.

EXAMPLE 16

Control

For comparison purposes, a commercially obtained general purpose polypropylene resin having a melt index of 3.4 was tested for dyeability. Monofilament samples treated using the procedure in Example 1 and Example 16 were uncolored.

EXAMPLE 17

Polypropylene/polyethylene copolymer control

To a 700 ml. stirred stainless steel pressure reactor is charged, under an argon atmosphere, 0.29 g. of 3 TiCl$_3$·AlCl$_3$ and 4.1 cc. of 1.0 molar diethyl aluminum chloride in cyclohexane. The Al/Ti mole ratio is 2/1.

The reactor is purged with hydrogen, closed, and pressured to 5 p.s.i.g. with hydrogen. Then 400 ml. of liquid propylene (0.58 g./cc.) is introduced with stirring at 75° F. The polymerization temperature is increased within about 10 minutes to 150° F. with external heating. The reactor pressure is that of the propylene gas at equilibrium. Within 5 minutes after the propylene charge, ethylene gas is added to the reactor at the rate of 0.08 g. per minute for the duration of the run. Every 5 minutes 15 ml. of liquid propylene is added to maintain the propylene concentration in the reactor. At the end of 90 minutes the reactor is vented to 0 p.s.i.g. and cooled to 100° F.

The polymer is then transferred into a two liter beaker and stirred for 2 hours at 70° C. with 1 liter of a 50–50 volume mixture of heptane and isopropyl alcohol. The hot slurry is then filtered and the washing repeated with fresh heptane-isopropyl alcohol mix. After filtering, the washed polymer is vacuum dried for 4 hours at 80° C.

A yield of 121 g. of dry powdered polymer is obtained with a melt index at 230° C. according to ASTM–D–1238–62T of 1.9. By infrared analysis the polymer is found to contain 4.1 weight percent ethylene. Samples of this polymer treated as in Example 1 and Example 6 were found to be non-dye receptive.

I have also found that those polypropylene homopolymer, random or block copolymer compositions which contain any of the above identified comonomers of my invention exhibit superior impact strength (ASTM–D–1822–61T) than the corresponding propylene compositions which do not have a terminal block of my identified comonomers. In addition certain copolymers exhibit some improved properties such as stiffness, tensile yield strength, flexure, etc. When acrylonitrile is the chosen terminal block polymer, this increase in tensile properties is even more marked in comparison to the corresponding propylene compositions.

What is claimed is:

1. A crystalline polypropylene composition comprising a substantially linear propylene block copolymer containing in the polymer chain the grouping

wherein P represents a composition selected from the group consisting of a propylene homopolymer, a propylene random copolymer, and a propylene block copolymer, and F represents a terminal block copolymer chain produced from a comonomer selected from the group consisting of oxetanes, acetaldehyde, and vinyl compounds which vinyl compounds are represented by the formula:

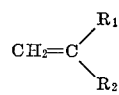

wherein $R_1$ is selected from the group consisting of hydrogen, nitrile, carboxylic acid or esters thereof, ketone, a substituted alkyl or aryl group, ether, or organic phosphonates and $R_2$ is selected from the group consisting of nitrile, carboxylic acid or esters thereof, ether, or organic phosphonates and wherein said terminal block copolymer chain is present in the range of 0.1 to 25% by weight based on the weight of the polymer in said composition, said P—F group being in intimate admixture with crystalline propylene homopolymer.

2. The product according to claim 1 in which the F unit is present in the composition in amounts of from about 1 to about 5% by weight based on the weight of the polymers in the composition.

3. The product according to claim 1 in which the comonomer is acrylonitrile.

4. The product according to claim 1 in which the comonomer is 4-vinylpyridine and this is present in amounts of from 1 to 5%.

5. The product according to claim 1 in which the comonomer is ethylene oxide.

6. The product according to claim 1 in which the comonomer is bis(beta-chloroethyl)vinyl phosphonate.

7. The product according to claim 1 in which the comonomer is acetaldehyde.

8. The product according to claim 1 in which the comonomer is 2-methyl, -5 vinylpyridine and this is present in amounts of from 1 to 5%.

9. The product according to claim 1 in which the comonomer is N-vinylpyrrolidone and this is present in amounts of from 1 to 5%.

10. The product according to claim 1 in which the comonomer is dimethylaminoethyl vinyl ether.

11. The product according to claim 1 in which the comonomer is isobutylvinylether.

12. The product according to claim 1 in which the comonomer is vinylacetate.

13. The product according to claim 1 in which the comonomer is methacrylic acid.

14. The product according to claim 1 in which the comonomer is tetrahydrofurfurylamine.

15. The product according to claim 1 in which the comonomer is tetrahydrofuran.

16. The product according to claim 1 in which the comonomer is methyl vinyl ketone.

References Cited

UNITED STATES PATENTS

| | | | |
|---|---|---|---|
| 3,073,667 | 1/1963 | Bonvicini et al. | 260—878 |
| 3,189,664 | 6/1965 | Nozaki | 260—878 |
| 3,254,140 | 5/1966 | Hagemeyer et al. | 260—878 |
| 3,293,326 | 12/1966 | Jezi et al. | 260—878 |
| 3,301,921 | 1/1967 | Short | 260—878 |
| 3,308,108 | 3/1967 | Feldhoff et al. | 260—878 |
| 3,315,014 | 4/1967 | Coover et al. | 260—895 |

SAMUEL H. BLECH, Primary Examiner

M. J. TULLY, Assistant Examiner

U.S. Cl. X.R.

260—874, 878